(12) United States Patent
Anders

(10) Patent No.: US 10,859,115 B2
(45) Date of Patent: Dec. 8, 2020

(54) LANDING BEARING ASSEMBLY AND ROTARY MACHINE EQUIPPED WITH SUCH AN ASSEMBLY AND A MAGNETIC BEARING

(71) Applicant: SKF Magnetic Mechatronics, Saint-Marcel (FR)

(72) Inventor: Jens Anders, Vernon (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 189 days.

(21) Appl. No.: 15/682,950

(22) Filed: Aug. 22, 2017

(65) Prior Publication Data

US 2018/0128315 A1 May 10, 2018

(30) Foreign Application Priority Data

Aug. 31, 2016 (DE) .................. 10 2016 216 427

(51) Int. Cl.
| | |
|---|---|
| *F16C 32/04* | (2006.01) |
| *F16C 35/073* | (2006.01) |
| *F16C 35/077* | (2006.01) |
| *H02K 7/09* | (2006.01) |

(52) U.S. Cl.
CPC ...... *F16C 32/0474* (2013.01); *F16C 32/0442* (2013.01); *F16C 35/073* (2013.01); *F16C 35/077* (2013.01); *H02K 7/09* (2013.01); *F16C 2206/00* (2013.01); *F16C 2380/26* (2013.01)

(58) Field of Classification Search
CPC .............. F16C 32/0474; F16C 32/0442; F16C 35/073; F16C 35/077; F16C 2206/00; F16C 2380/26; H02K 7/09
USPC ........................................................ 310/90.5
See application file for complete search history.

(56) References Cited

U.S. PATENT DOCUMENTS

| | | | |
|---|---|---|---|
| 3,794,334 A | * | 2/1974 | Prasse ........................ F16J 9/26 |
| | | | 277/442 |
| 6,004,372 A | | 12/1999 | Quets |
| 6,139,261 A | * | 10/2000 | Bishop ...................... F16C 3/00 |
| | | | 415/148 |

(Continued)

FOREIGN PATENT DOCUMENTS

| | | |
|---|---|---|
| CN | 101265946 A | 9/2008 |
| CN | 104214215 A | 12/2014 |

(Continued)

OTHER PUBLICATIONS

A translated version of foreign patent numberDE 102006049974 A1 from Espacenet website. (Year: 2008).*

(Continued)

*Primary Examiner* — Shawki S Ismail
*Assistant Examiner* — Htet Z Kyaw
(74) *Attorney, Agent, or Firm* — Garcia-Zamor Intellectual Property Law; Ruy Garcia-Zamor; Bryan Peckjian

(57) ABSTRACT

A landing bearing assembly for a rotary machine having a stator assembly, a rotor assembly and a magnetic bearing. The landing bearing assembly having a stator landing portion integral with the stator assembly and a rotor landing portion integral with the rotor assembly. A first coating, which is an anti-wear and/or an anti-friction coating, is dispensed on at least one of the stator landing portion and the rotor landing portion. The invention also concerns such a rotary machine.

20 Claims, 2 Drawing Sheets

(56) References Cited

U.S. PATENT DOCUMENTS

| | | | |
|---|---|---|---|
| 6,986,647 B2* | 1/2006 | Jones | F04B 15/08 |
| | | | 310/254.1 |
| 7,847,454 B2 | 12/2010 | Weeber et al. | |
| 8,147,981 B2* | 4/2012 | Lang | C23C 24/04 |
| | | | 428/615 |
| 2003/0205944 A1 | 11/2003 | Adams et al. | |
| 2006/0135269 A1* | 6/2006 | Zhou | F16C 17/107 |
| | | | 464/132 |
| 2008/0145649 A1* | 6/2008 | Mannem | C10M 111/00 |
| | | | 428/336 |
| 2008/0218008 A1* | 9/2008 | Ghasripoor | C22C 38/001 |
| | | | 310/45 |
| 2009/0311476 A1* | 12/2009 | Stetina | B05D 5/08 |
| | | | 428/141 |
| 2011/0049109 A1* | 3/2011 | Weeber | C22C 19/055 |
| | | | 219/75 |
| 2014/0334754 A1* | 11/2014 | Krebs | F16C 39/02 |
| | | | 384/291 |
| 2014/0334755 A1* | 11/2014 | Krebs | F16C 39/02 |
| | | | 384/322 |
| 2014/0354098 A1* | 12/2014 | Krebs | F16C 32/0474 |
| | | | 310/90.5 |
| 2015/0260221 A1* | 9/2015 | Anders | F01D 25/168 |
| | | | 384/448 |
| 2015/0337894 A1* | 11/2015 | Yoshino | F16C 17/024 |
| | | | 384/103 |
| 2018/0149204 A1* | 5/2018 | Baudelocque | F16C 39/02 |
| 2018/0347390 A1* | 12/2018 | Wilson | C23C 14/0641 |

FOREIGN PATENT DOCUMENTS

| | | |
|---|---|---|
| DE | 102006049974 A1 | 4/2008 |
| EP | 1967288 A3 | 3/2013 |
| EP | 1967289 A3 | 7/2013 |
| EP | 2803875 A1 | 11/2014 |

OTHER PUBLICATIONS

Search report from EIC 2800 searcher Mesfin Getaneh dated Apr. 4, 2019. (Year: 2019).*

* cited by examiner

LANDING BEARING ASSEMBLY AND ROTARY MACHINE EQUIPPED WITH SUCH AN ASSEMBLY AND A MAGNETIC BEARING

CROSS REFERENCE TO RELATED APPLICATIONS

This application claims priority to German patent application no. 102016216427.9 filed on Aug. 31, 2016, the contents of which are fully incorporated herein by reference.

FIELD OF THE INVENTION

The invention concerns a landing bearing assembly to be used in a rotary machine comprising a rotor assembly, a stator assembly and a magnetic bearing, and operating in a corrosive environment. The invention also relates to a rotary machine comprising a landing bearing assembly.

BACKGROUND OF THE INVENTION

A conventional rotary machine such as a compressor or a turboexpander used in the Oil and Gas industry for the extraction and transportation of the gas or the oil comprises a rotor assembly, a stator assembly and a magnetic bearing. They all operate in a process gas such as natural gas at pressures up to several hundred bars. Unfortunately this natural gas is corrosive because contains corrosive contaminants or materials such as hydrogen sulfide ($H_2S$), carbon dioxide ($CO_2$) and water. On the positive side, this process gas which circulates through the rotary machine is used to cool down the machine and in particular the magnetic bearing.

The magnetic bearing comprises electromagnetic coils installed on the stator assembly which surrounds radially and/or axially the rotor assembly which comprises ferromagnetic material. The electromagnetic coils produce a magnetic force on the ferromagnetic material that tends to attract radially and/or axially the rotor assembly. In order to avoid any physical contact between the stator and the rotor, which may lead, in the worst case, to the destruction of the machine when rotating at high speed, landing bearings, also known as emergency bearings or backup bearings, are arranged in the machine. The landing bearings comprise parts which are integral with the stator assembly. These parts can be rolling or plain bearings, and are designed to "land" onto the rotor shaft so as to rotatably support the rotor in case of failure or shutdown of the magnetic bearing. During landing, the inner ring of the rolling bearing comes in contact with the rotor assembly, either directly on the rotor itself or on a landing sleeve installed on the rotor.

It is known from U.S. Pat. No. 7,847,454 B2 to equip an encapsulated stator assembly of a machine to be used in a corrosive environment with a rolling bearing the inner ring of which is made from a martensitic nitrogen stainless steel, and a rotor of the machine with a landing sleeve formed of a cobalt based superalloy steel or a nickel-cobalt based alloy.

Nowadays, landing bearing assemblies must operate several times during the whole lifespan of the machine, voluntary or not. In other words, it is required that their lifetime is increased. Further, it is desired that they last as long as the machine in order to avoid expensive maintenance costs. It is therefore essential that the landing bearing assemblies not only are resistant to the corrosion when operating in a corrosive environment, but also that their surfaces which come into contact with each other exhibit a high hardness so as to avoid or at least limit as much as possible their wear.

Consequently, there is room for improvement.

BRIEF SUMMARY OF THE INVENTION

The aim of the invention is to provide an improved landing bearing assembly to be used in a rotary machine comprising a stator assembly, a rotor assembly and a magnetic bearing.

To this end, the invention concerns a landing bearing assembly comprising a stator landing portion and a rotor landing portion, these two portions being designed to come into contact with one another upon landing of the rotor assembly. The stator landing portion is integral with the stator assembly, whereas the rotor landing portion is integral with the rotor assembly, and in particular with the shaft of the rotor assembly.

According to the invention, at least one of the stator landing portion and the rotor landing portion is dispensed with an anti-wear and/or an anti-friction first coating.

Thanks to the invention, the landing bearing assembly can have a prolonged life because the wear of the surfaces of the stator landing portion and the rotor landing portion which come into contact during landing of the rotor is slowed down. Hence, expensive maintenance costs can be avoided, and the operating time of the rotary machine can be maximized.

Moreover, the coatings are preferably also resistant to the corrosion, so that the landing bearing assembly can operate in direct contact with a corrosive fluid which can hence advantageously contribute to the cooling of the former without jeopardizing the operation of the landing bearing assembly and hence of the rotary machine.

According to further aspects of the invention which are advantageous but not compulsory, such a landing bearing assembly may incorporate one or several of the following features:

The first coating is dispensed on both stator landing portion and the rotor landing portion.

The first coating is made from tungsten carbide.

The first coating is made from DLC.

The first coating is made from tungsten carbide in a matrix of cobalt-chrome.

The first coating is made from alumines in a matrix of titanium and a sub-layer of nickel-aluminum alloy is first applied.

A second coating made of DLC is applied onto the first coating.

The stator landing portion is made from a high nitrogen steel.

The rotor landing portion is made from a nickel based alloy.

The stator landing portion consists of a double row angular contact bearing or a pair of single row angular contact bearings.

The stator landing portion consists of a single ring.

The rotor landing portion consists of a landing sleeve.

The thickness of each coating is between one and ten tenth of a millimeter.

Each coating is dispensed only on a surface of the stator landing portion and/or the rotor landing portion which come into contact with each other during landing of the rotor assembly.

Another object of the invention is a rotary machine comprising a stator assembly, a rotor assembly, a magnetic bearing and a landing bearing assembly according to the invention.

BRIEF DESCRIPTION OF THE SEVERAL VIEWS OF THE DRAWING

The invention will now be explained in correspondence with the annexed figures, and as an illustrative example, without restricting the object of the invention. In the annexed figures.

DETAILED DESCRIPTION OF THE INVENTION

Figure 1:
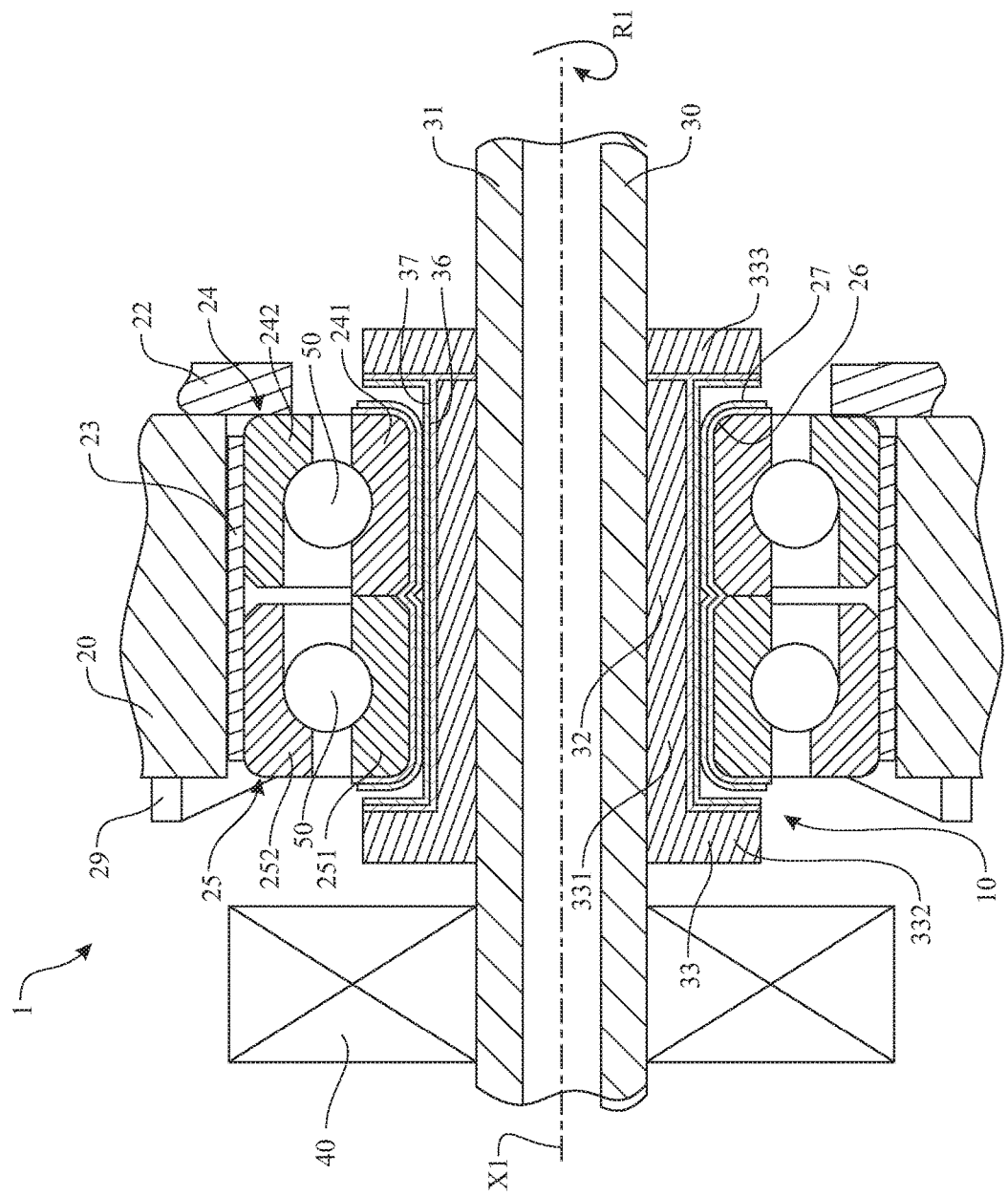
FIG. 1 is a longitudinal sectional view of a first embodiment of landing bearing assembly according to the invention and a rotary machine according to the invention comprising a stator, a rotor, a magnetic bearing and a landing bearing.
Figure 2:
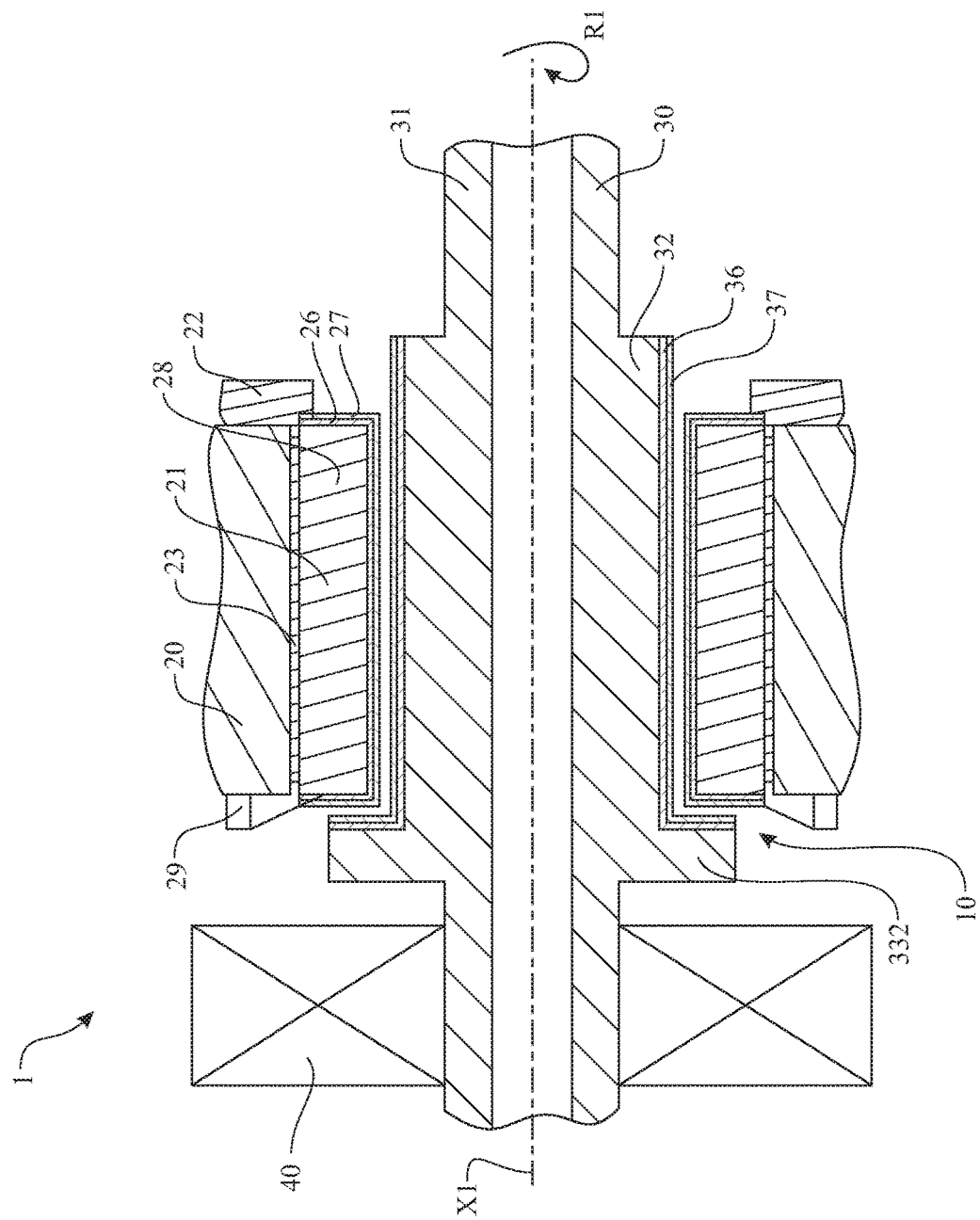
FIG. 2 is a longitudinal sectional view of a second embodiment of landing bearing assembly according to the invention and a rotary machine according to the invention comprising a stator, a rotor, a magnetic bearing and a landing bearing.

FIGS. 1 and 2 show a rotary machine 1 centered on a central axis X1.

The rotary machine 1 is an electric compressor or a turboexpander used for the extraction of oil or gas in the nature. Most of the parts of the rotary machine 1 operate in a pressurized corrosive medium, for example natural or sour gas.

The rotary machine 1 comprises a stator assembly 20, a rotor assembly 30, a magnetic bearing 40, and a landing bearing assembly 10.

The stator assembly 20 comprises a housing (not represented), a compliant tubular bush 23, a lateral holder 22 and a backing device 29. The tubular bush 23 is fitted inside the housing. The holder 22 and the backing device 29 form means for fastening and preloading a stator landing portion 21 to the stator assembly 20. The stator landing portion 21 constitutes a first element of the landing bearing assembly 10.

The tubular bush 23 has two functions. The first one is to hold tight and to center the stator landing portion 21 with respect to the stator housing. The second function is to dampen vibrations generated inside the rotary machine 1.

The rotor assembly 30 comprises a (preferably but not necessarily hollow) rotor shaft 31 and a rotor landing portion 32 constituting a second element of the landing bearing assembly 10.

The landing bearing assembly 10 consists of the stator landing portion 21 integral with the stator assembly 20, and the rotor landing portion 32 integral with the rotor assembly 30. Upon landing of the rotor assembly 30, the stator landing portion 21 and the rotor landing portion 32 come into direct contact with each other.

The rotor assembly 30 is movable in rotation R1 around axis X1.

The magnetic bearing 40 is schematically represented on FIGS. 1 and 2, its arrangement relative to the stator assembly 20 and rotor assembly 30 being not shown, for simplification purpose. The magnetic bearing may consist of a radial magnetic bearing, an axial magnetic, or a combination of at least one radial magnetic bearing and one axial magnetic bearing. The magnetic bearing is preferably of the active type.

The landing bearing assembly 10, also known as emergency bearing, back-up bearing or touch down bearing, supports the rotor assembly 30 essentially during a starting or stopping operation of the rotary machine 1, and also during brief intermittent periods in case of shock-loads in the event of a total or partial failure of the magnetic bearing 40.

In order to achieve a good friction behavior between the stator landing portion 21 and the rotor landing portion 32, one or both of the contacting surfaces of these portions is treated in order to increase its hardness. Such treatment consists of one or several coatings.

The rotary machine 1 equipped with the landing bearing assembly 10 is intended to be used in a very corrosive environment during their whole lifetime, in particular during the extraction and transportation of oil or natural gas. The different elements constituting the rotary machine 1 and the landing bearing assembly 10 are intended to be in direct contact with the corrosive environment, typically a sour gas at very high temperature (a few hundred Celsius degrees) and very high pressure (a few hundred bars).

Therefore, the stator landing portion 21 and the rotor landing portion 32 are made of a corrosion resistance material.

In a preferred embodiment, the stator landing portion 21 is made of a high nitrogen steel such as NitroMax.

Further, the stator landing portion 21 comprises a first coating 26 with anti-wear and/or anti-friction properties. In a preferred embodiment of the invention, the first coating is an anti-wear coating, and is made of tungsten carbide or DLC.

In another embodiment of the invention, the first coating is an anti-wear coating and is made of alumines in a matrix of titanium. In order to enhance to adherence of this first coating, a sub-layer of nickel-aluminum alloy is first applied onto the stator landing portion 21. The coating made of alumines in a matrix of titanium is then applied directly onto the sub-layer of nickel-aluminum alloy.

In yet another embodiment of the invention, the first coating is an anti-wear coating and is made of tungsten carbide in a matrix of cobalt-chrome.

Advantageously, the stator landing portion 21 comprises a second coating 27 with anti-wear and/or anti-friction properties. In a preferred embodiment of the invention, the second coating is an anti-wear coating. This second coating 27 is preferably made of DLC (Diamond Like Carbon).

In a preferred embodiment, the rotor landing portion 32 is made of a nickel based alloy, preferably an Inconel such as Inconel-718, or an austenitic stainless steel such as Nitronic60, or a hardenable stainless steel such as a martensitic or austenitic high nitrogen stainless steel. In another embodiment, the rotor landing portion 32 is made of a cobalt-based alloy.

The rotor landing portion 32 comprises a first coating 36 with anti-wear and/or anti-friction properties. In a preferred embodiment of the invention, the first coating 36 is an anti-wear coating, and is made of tungsten carbide or DLC.

In another embodiment of the invention, the first coating 36 is made of alumines in a matrix of titanium, and a sub-layer of nickel-aluminum alloy is first applied onto the rotor landing portion 21. The coating made of alumines in a matrix of titanium is then applied directly onto the sub-layer of nickel-aluminum alloy.

In yet another embodiment of the invention, the first coating is an anti-wear coating and is made of tungsten carbide in a matrix of cobalt-chrome.

Advantageously, the rotor landing portion 32 comprises a second coating 37 with anti-wear and/or anti-friction properties. This second coating 37 is preferably made of DLC.

The different coatings can be applied according to different known methods chosen among thermal spraying, PEPVD or PECVD.

The coatings can be ceramic based coatings or oxide based coatings. Ceramic coatings such as tungsten carbide in a matrix of cobalt-chrome, onto which a thin layer of DLC is added, are well adapted for resistance against wear and friction.

The thickness of each coating is between one and ten tenth of a millimeter.

Since coatings are expensive devices, preferably the coatings are dispensed only on the surfaces of the stator landing portion 21 and of the rotor landing portion 21 which come into contact with each other during landing of the rotor shaft 31.

Moreover, each coating is preferably also resistant to corrosion, so that the landing bearing assembly can operate in direct contact with a corrosive fluid which can hence advantageously contribute to the cooling of the former without jeopardizing the operation of the landing bearing assembly and hence of the rotary machine.

Furthermore, it is highly preferable to have both stator landing portion and rotor landing portion made of materials highly resistant to the corrosion, because in the case where the first coating, or the first and second coatings originally present on the stator landing portion and/or the rotor landing portion has been removed upon contact of the landing surfaces in such a way that the material constituting the stator landing portion and rotor landing portion comes in direct contact with the corrosive environment, the landing bearing assembly will still exhibit a high resistant to corrosion.

In the preferred embodiment of the invention illustrated on FIG. 1, the stator landing portion 21 includes two adjacent ball bearings 24 and 25, also known as tandem ball bearings, preloaded and particularly adapted for use in pressurized environment. Bearing 24 includes an outer ring 242 and an inner ring 241, while bearing 25 includes an outer ring 252 and an inner ring 251.

Preferably, the stator landing portion 21 is a double row angular contact ball bearing.

Alternatively, the stator landing portion 21 is a pair of single row angular contact bearings.

Balls 50 are located between the inner ring and the outer ring of each ball bearing s, 25. Balls 50 may be made of ceramic or steel. Outer rings 242 and 252 are fitted inside tubular bush 23. Lateral holder 22 is positioned against outer ring 242, while backing device 29 is positioned against outer ring 252. Holder 22 and device 29 form means for fastening outer rings 242 and 252 to the stator assembly 20.

Inner rings 241 and 251 are made from a corrosion resistance material, such as a high nitrogen steel. Preferably the inner rings are made of NitroMax.

The inner rings 241 and 251 comprise a first coating 26 with anti-wear and/or anti-friction properties. In a preferred embodiment of the invention, the first coating is made of tungsten carbide or DLC. In another embodiment of the invention, the first coating is made of alumines in a matrix of titanium and a sub-layer of nickel-aluminum alloy is first applied. In yet another embodiment of the invention, the first coating is made of tungsten carbides in a matrix of cobalt-chrome.

Advantageously, the inner rings 241 and 251 comprise a second coating 27 made of DLC.

As still illustrated on FIG. 1, the rotor landing portion 32 consists of a landing sleeve 33 which is installed on the rotor shaft 31. Preferably, the landing sleeve 33 is solidar in rotation with the rotor shaft. The landing sleeve 33 is installed on the shaft either by force fitting or by thermal expansion under the effect of temperature. The landing sleeve 33 is made from a corrosion resistance material such as Inconel-718.

The landing sleeve 33 is L-shaped or U-shaped.

The landing sleeve can consist of a single piece or be made of two pieces.

The landing sleeve features an axial portion 331 with at one end a first radial portion 332. The landing sleeve may also comprise a second radial portion 333.

Thanks to the first radial portion 332 and/or the second radial portion 333, the rotor assembly 30 can land safely so as to avoid a not desired uncontrolled and excessive axial displacement of the rotor assembly 30 with respect to the stator assembly 20.

The landing sleeve 33 comprises a first coating 36 with anti-wear and/or anti-friction properties. In a preferred embodiment of the invention, the first coating 36 is an anti-wear coating, and is made of tungsten carbide or DLC. In another embodiment of the invention, the first coating 36 is made of alumines in a matrix of titanium and a sub-layer of nickel-aluminum alloy is first applied in order to enhance the adherence of the coating. In yet another embodiment of the invention, the first coating is made of tungsten carbides in a matrix of cobalt-chrome. Advantageously, the landing sleeve 33 comprises a second coating 37 made of DLC.

FIG. 2 illustrates another preferred embodiment of the invention where, for the sake of simplicity and clarity, the same elements as illustrated on FIG. 1 bear the same numeral references.

The embodiment of FIG. 2 differs from the one of FIG. 1 in that the stator landing portion 21 consists of a single ring, and in that the rotor landing portion 32 is not an additional piece such as the landing sleeve described earlier, but instead forms part of the rotor assembly 30, and in particular the rotor shaft 31 itself.

Thanks to the invention, the rotary machine 1 can be operated with less risk of corrosion of the elements constituting the landing bearing assembly 10. This allows also prolonged maintenance intervals and improved run times. Furthermore, more corrosive fluids can be processed in direct contact with the elements constituting the landing bearing assembly 10, thus avoiding sophisticated solutions such as labyrinths or dry gas seals.

In addition, technical features of the different embodiments can be, in whole or part, combined with each other. Thus, the landing bearing assembly 10 can be adapted to the specific requirements of the application. For instance, in another preferred embodiment of the invention, the stator landing portion 21 consists of a double row angular contact bearing and the rotor landing portion 32 consists of a portion integrally formed with the rotor shaft 31.

The rotary machine 1 described in details previously is an electric compressor or a turboexpander used for the extraction of oil or gas in the nature. Alternatively, the rotary machine 1 may be of any kind adapted for a transportation vehicle, a machine-tool, a household apparatus, etc. For instance, the rotary machine 1 may be an electric compressor equipping an automotive vehicle.

NOMENCLATURE 1 rotary machine
10 landing bearing assembly
20 stator assembly
21 stator landing portion
22 holder
23 tubular bush
24 ball bearing
241 inner ring
242 outer ring
25 ball bearing
251 inner ring
252 outer ring
26 first coating
27 second coating
28 landing ring
29 backing device
30 rotor assembly
31 rotor shaft
32 rotor landing portion
33 landing sleeve
331 axial portion
332 first radial portion
333 second radial portion
36 first coating
37 second coating
40 magnetic bearing
50 balls

The invention claimed is:

1. A landing bearing assembly for a rotary machine comprising:
   a stator landing portion configured to be engageable with a stator assembly of the rotary machine;
   a rotor landing portion integral with a rotor assembly of the rotary machine,
   wherein the stator landing portion and the rotor landing portion comprise a corrosion resistance material;
   wherein the stator assembly comprises a first stator axial end and a second stator axial end, a lateral holder being disposed adjacent to the first stator axial end and a backing device being disposed adjacent to the second stator axial end, wherein the lateral holder and the backing device are configured to fasten the stator landing portion to the stator assembly;
   wherein the rotor landing portion comprises a landing sleeve, the landing sleeve comprising an axial portion and a first radial portion, the first radial portion radially extending from a first axial end of the axial portion; and
   a first coating dispensed on the first radial portion and axial portion of the landing sleeve, the first coating being an anti-wear or an anti-friction coating.

2. The landing bearing assembly according to claim 1, wherein the first coating is also located on an inner ring of a bearing of the stator landing portion.

3. The landing bearing assembly according to claim 2, wherein the first coating is made of alumines in a matrix of titanium, and
   wherein a sub-layer of nickel-aluminium alloy is first applied.

4. The landing bearing assembly according to claim 1, wherein the first coating is made of tungsten carbide in a matrix of cobalt-chrome.

5. The landing bearing assembly according to claim 1, further comprising a second coating made of diamond like carbon is applied onto the first coating.

6. The landing bearing assembly according to claim 1, wherein the corrosion resistance material of the stator landing portion comprises a high nitrogen steel.

7. The landing bearing assembly according to claim 1, wherein the corrosion resistance material of the rotor landing portion comprises a nickel based alloy.

8. The landing bearing assembly according to any claim 1, wherein the stator landing portion consists of a double row angular contact ball bearing or a pair of single row angular contact bearings.

9. The landing bearing assembly according to claim 1, wherein the stator landing portion consists of a single ring.

10. The landing bearing assembly according to claim 1, wherein the landing sleeve has a U-shape.

11. The landing bearing assembly according to claim 1, wherein the rotor landing portion forms part of the rotor shaft itself.

12. The landing bearing assembly according to claim 1, wherein a thickness of the first coating is between one tenth and ten tenths of a millimeter.

13. A The rotary machine comprising:
    the landing bearing assembly of claim 1, and
    a magnetic bearing.

14. The rotary machine according to claim 13, wherein the landing sleeve comprises a second radial portion which extends radially from a second axial end of the axial portion, the first coating being located on the second radial portion such that the first coating forms a U-shape on the landing sleeve.

15. The landing bearing assembly according to claim 1, wherein a thickness of the first coating is between one tenth and ten tenths of a millimeter.

16. The landing bearing assembly according to claim 1, wherein the first coating is corrosion resistant and operates in direct contact with a corrosive fluid for cooling.

17. The landing bearing assembly according to claim 1, wherein the landing sleeve comprises a second radial portion which extends radially from a second axial end of the axial portion, the first coating being located on the second radial portion such that the first coating forms a U-shape on the landing sleeve.

18. The landing bearing assembly according to claim 17, wherein the stator landing portion comprises a bearing having an inner ring, the landing sleeve and the first coating defining a recess configured to receive the bearing therein, when the bearing is seated with the inner ring abutting the first coating along the axial portion of the landing sleeve a portion of the inner ring extends radially out of the recess and radially past the first and second radial portions of the landing sleeve.

19. The landing bearing assembly according to claim 17, further comprising a second coating, of different material from the first coating, being located on the first coating, wherein the stator landing portion comprises a bearing having an inner ring, the landing sleeve, the first coating, and the second coating defining a recess configured to receive the bearing therein, when the bearing is seated with the inner ring abutting the second coating along the axial portion of the landing sleeve a portion of the inner ring extends radially out of the recess and radially past the first and second radial portions of the landing sleeve.

20. A rotary machine comprising:
a stator assembly,
a stator landing portion configured to be engageable with the stator assembly, the stator landing portion having an axially extending radially inner surface,
the stator landing portion further comprising a tubular bush disposed on the axially extending radially inner surface thereof,
the stator landing assembly further comprising a bearing disposed on the tubular bush thereof,
a rotor landing portion integral with a rotor assembly of the rotary machine, wherein the stator landing portion and the rotor landing portion comprise a corrosion resistance material,
wherein the rotor landing portion comprises a landing sleeve, the landing sleeve comprising an axial portion and a first radial portion, the first radial portion radially extending from a first axial end of the axial portion;
a first coating dispensed on the first radial portion and axial portion of the landing sleeve, the first coating being an anti-wear or an anti-friction coating,
the axial portion defining a first piece of the landing sleeve and the first radial portion defining a second piece of the landing sleeve, the first piece and the second piece being separated by the first coating,
the stator assembly having first and second stator axial ends, a lateral holder disposed adjacent to the first stator axial end,
a backing device disposed adjacent to the second stator axial end, wherein the lateral holder and the backing device are configured to fasten the stator landing portion to the stator assembly; and prevent the bearing from moving axially relative to the stator landing portion.

* * * * *